United States Patent [19]

French

[11] 3,824,467

[45] July 16, 1974

[54] PRIVACY TRANSMISSION SYSTEM

[75] Inventor: Richard Charles French, Redhill, England

[73] Assignee: U.S. Philips Corporation, New York, N.Y.

[22] Filed: Dec. 1, 1972

[21] Appl. No.: 311,443

[30] Foreign Application Priority Data

Dec. 2, 1971 Great Britain .................... 56081/71

[52] U.S. Cl. .............. 325/32, 179/1.5 S, 179/1.5 R, 178/22

[51] Int. Cl. ........................................... H04k 1/06

[58] Field of Search ......... 178/22; 179/1.5 R, 1.5 S; 325/32

[56] References Cited

UNITED STATES PATENTS

| | | | |
|---|---|---|---|
| 2,453,659 | 11/1948 | De Regnauld De Bellescize.. | 178/22 |
| 3,105,114 | 9/1963 | Koenig, Jr. | 179/1.5 R |
| 3,188,391 | 6/1965 | Raymond | 179/1 .5 S |
| 3,657,699 | 4/1972 | Rocher | 178/22 |
| 3,731,197 | 5/1973 | Clark | 178/22 |

*Primary Examiner*—Richard A. Farley
*Assistant Examiner*—H. A. Birmiel
*Attorney, Agent, or Firm*—Frank R. Trifari; Simon L. Cohen

[57] ABSTRACT

A selector switching system and a number of memory devices, each capable of storing one time element of a voice transmission signal and simultaneously releasing a stored time element, which form an encoder and decoder for a transmission system, where a voice transmission signal is divided into consecutive time elements that are rearranged to form an unintelligible transmitted signal.

26 Claims, 9 Drawing Figures

Figure 1:
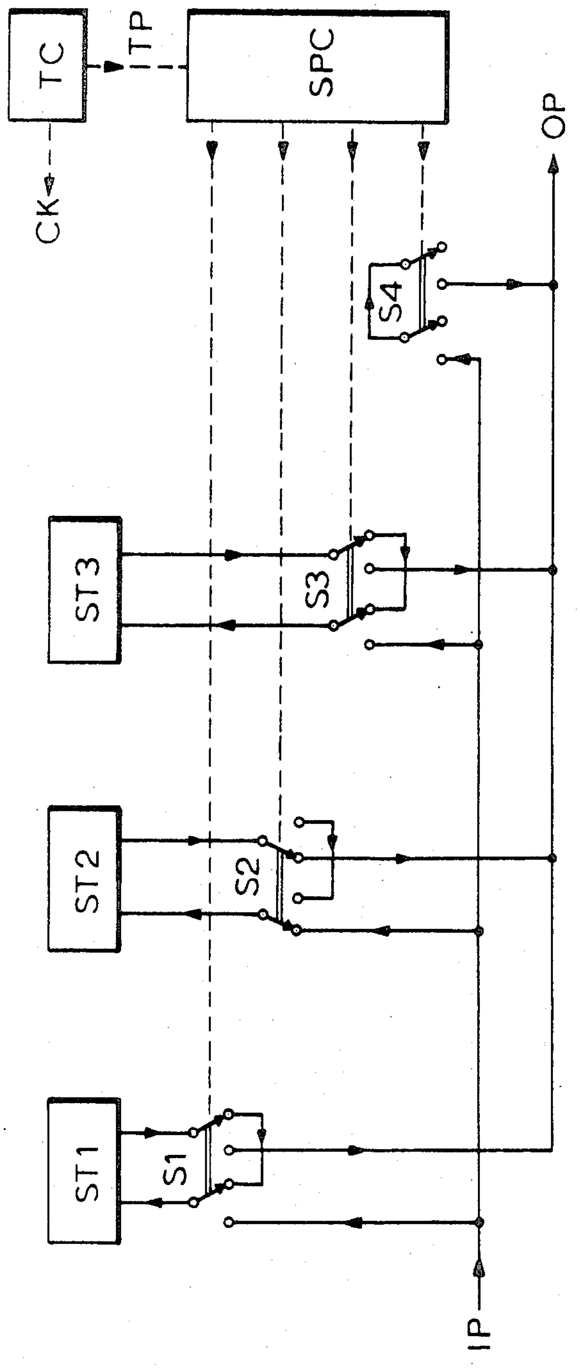

| | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|
| ORIG. SIGNAL | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | - | - | - | - | - | - |
| SELECT$^{N}$ SEQ | | 1 | 2 | 3 | 3 | 1 | 4 | 4 | 2 | 1 | 3 | 1 | 1 | 3 | 2 | 3 | 1 | 1 | 1 | 4 | 2 | 3 | 3 | 3 | 1 | 2 | 1 | 4 | 4 | 3 | 4 | 2 | 1 | 3 | | | |
| S1 | IN | 1 | | | | 5 | | | | 9 | | 11 | 12 | | | | 16 | 17 | 18 | | | | | | 24 | | 26 | | | | | | - | | | | |
| | OUT | - | | | | 1 | | | | 5 | | 9 | 11 | | | | 12 | 16 | 17 | | | | | | 18 | | 24 | | | | | | 26 | | | | |
| S2 | IN | | 2 | | | | | | 8 | | | | | | 14 | | | | | | 20 | | | | | 25 | | | | | | - | | | | | |
| | OUT | | - | | | | | | 2 | | | | | | 8 | | | | | | 14 | | | | | 20 | | | | | | 25 | | | | | |
| S3 | IN | | | 3 | 4 | | | | | | 10 | | | 13 | | 15 | | | | | | 21 | 22 | 23 | | | | | | 29 | | | | - | | | |
| | OUT | | | - | 3 | | | | | | 4 | | | 10 | | 13 | | | | | | 15 | 21 | 22 | | | | | | 23 | | | | 29 | | | |
| S4 | IN | | | | | | 6 | 7 | | | | | | | | | | | | 19 | | | | | | | | 27 | 28 | | 30 | | | | | | |
| | OUT | | | | | | 6 | 7 | | | | | | | | | | | | 19 | | | | | | | | 27 | 28 | | 30 | | | | | | |
| XMITT$^{D}$ SIG. | | - | - | - | 3 | 1 | 6 | 7 | 2 | 5 | 4 | 9 | 11 | 10 | 8 | 13 | 12 | 16 | 17 | 19 | 14 | 15 | 21 | 22 | 18 | 20 | 24 | 27 | 28 | 23 | 30 | 25 | 26 | 29 | - | - | - |
| SELECT$^{N}$ SEQ | | | | | 1 | 2 | 3 | 2 | 4 | 1 | 4 | 1 | 3 | 2 | 4 | 1 | 2 | 3 | 2 | 1 | 4 | 4 | 3 | 2 | 4 | 1 | 1 | 3 | 2 | 4 | 1 | 4 | 4 | 3 | 2 | 3 | 1 |
| S1 | IN | | | | 3 | | | | | 5 | | 9 | | | | 13 | | | | 19 | | | | | | 20 | 24 | | | | 30 | | | | | | - |
| | OUT | | | | - | | | | | 3 | | 5 | | | | 9 | | | | 13 | | | | | | 19 | 20 | | | | 24 | | | | | | 30 |
| S2 | IN | | | | | 1 | | 7 | | | | | | 10 | | | 12 | | 17 | | | | | 22 | | | | | 28 | | | | | | - | | |
| | OUT | | | | | - | | 1 | | | | | | 7 | | | 10 | | 12 | | | | | 17 | | | | | 22 | | | | | | 28 | | |
| S3 | IN | | | | | | 6 | | | | | | 11 | | | | | 16 | | | | | 21 | | | | | 27 | | | | | | 29 | | - | |
| | OUT | | | | | | - | | | | | | 6 | | | | | 11 | | | | | 16 | | | | | 21 | | | | | | 27 | | 29 | |
| S4 | IN | | | | | | | | 2 | | 4 | | | | 8 | | | | | | 14 | 15 | | | 18 | | | | | 23 | | 25 | 26 | | | | |
| | OUT | | | | | | | | 2 | | 4 | | | | 8 | | | | | | 14 | 15 | | | 18 | | | | | 23 | | 25 | 26 | | | | |
| RECONST. SIG | | | | | | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |

Fig. 3.

| ELEMENT No. | PSEUDO-RANDOM NUMBER | RECORDING COUNTER | | | ENCODER STORE ADDRESS | DATA HIGHWAY | CONTROLLING COUNTER | | | DECODER STORE ADDRESS |
|---|---|---|---|---|---|---|---|---|---|---|
| | | RC1 | RC2 | RC3 | | | CC1 | CC2 | CC3 | |
| - | - | 1 | 2 | 3 | - | - | 4 | 5 | 6 | - |
| 1 | 3 | 0<br>6 | 1 | 2 | 1 | 6 | 3 | 4 | 5 | 0 |
| 2 | 0 | 5 | 0<br>6 | 1 | 2 | 6 | 2 | 3 | 4 | 0 |
| 3 | 3 | 4 | 5 | 0<br>6 | 3 | 6 | 1 | 2 | 3 | 0 |
| 4 | 3 | 3 | 4 | 5<br>6 | 3 | 5 | 0<br>5 | 1 | 2 | 1 |
| 5 | 1 | 2<br>6 | 3 | 5 | 1 | 2 | 4 | 0<br>2 | 1 | 2 |
| 6 | 0 | 5 | 2 | 4 | 0 | 6 | 3 | 1 | 0<br>6 | 3 |
| 7 | 0 | 4 | 1 | 3 | 0 | 6 | 2 | 0<br>6 | 5 | 2 |
| 8 | 2 | 3 | 0<br>6 | 2 | 2 | 0 | 1 | 5 | 4 | 0 |
| 9 | 1 | 2<br>6 | 5 | 1 | 1 | 2 | 0<br>2 | 4 | 3 | 1 |
| 10 | 0 | 5 | 4 | 0<br>6 | 3 | 0 | 1 | 3 | 2 | 0 |
| 11 | 1 | 4<br>6 | 3 | 5 | 1 | 4 | 0<br>4 | 2 | 1 | 1 |
| 12 | 1 | 5<br>6 | 2 | 4 | 1 | 5 | 3 | 1 | 0<br>5 | 3 |

Fig.8.

PRIVACY TRANSMISSION SYSTEM

This invention relates to privacy transmission systems in which intelligence is rendered unintelligible for transmission via a transmission medium, such as line or radio, and is again rendered intelligible after reception.

In such systems the intelligence is encoded in a predetermined manner to render it unintelligible to unauthorized third persons and, at the receiver, the original intelligence is recovered by means of a decoder which, in effect, reverses the encoding process so as to recover the original intelligence.

The invention more particularly relates to so-called time division privacy systems which render an intelligence signal unintelligible by dividing it into time elements of predetermined duration and rearranging these elements into a new sequence before transmission.

Time division privacy systems are well-known and, since the coding sequence can fairly readily be broken — by sonogram analysis for example — they only give short term security. Nevertheless, the amount of apparatus required for decoding by unauthorized third persons is very considerable. Such systems therefore find a use, for example, in mobile radio transmissions where any person equipped with a suitable FM receiver can listen-in to a message. Even if a third person had the requisite apparatus available, each individual message would take many hours to descramble — by which time the message would have been acted upon by the user and would no longer have any security value.

The time transposition of the individual elements of a message means that the elements have to be stored and delayed in the encoder until it is time for each to be transmitted. Various forms of storage delay means are known for this purpose but mainly fall into two categories; magnetic tape systems and delay line systems. In the tape system, the original intelligence is recorded on a tape loop and read out by a number of reading heads arranged around the loop at regular or irregular intervals. By switching from head to head in a prearranged sequence, the message elements can be transposed with respect to time and thus rendered unintelligible. At the receiver, similar apparatus is used to enable the scrambled elements to be rearranged in their original sequence to reconstitute the original message. Such equipment is both cumbersome and expensive, and is thus not particularly suitable for use in conjunction with mobile radio systems on a commercial basis.

It is also known for the store to comprise a tapped delay line in which the delay duration between the successive tappings equals the element duration. The intelligence signal passes continuously along the delay line and the element sequence is rearranged by taking outputs from the tappings in a predetermined sequence by means of a selector switch. This known form of privacy system has the disadvantage that all the elements remain in the delay line until they are lost at its final output. This is inefficient because most of the elements are used for transmission purposes before they reach the end of the delay line and are not required again. The delay line therefore holds redundant elements.

In general, if the elements are re-arranged in groups of X elements then the delay line requires $2(X - 1)$ delay sections to enable the elements to be re-arranged in any of the $X!$ possible re-arrangement patterns.

The object of the present invention is the provision of a privacy transmission system which overcomes the above disadvantages and which, compared with systems using delay lines, requires $(N - 1)$ storage delay elements at the most.

According to the present invention there is provided a privacy transmission system for the transmission of intelligence in which signals derived from the intelligence are divided into consecutive time elements each of duration $t$ and the sequence of the elements is disarranged in accordance with a predetermined program in an encoder to form an unintelligible sequence for transmission and in which after reception the elements of the unintelligible sequence are rearranged in their original sequence in a decoder, wherein the encoder and decoder each comprise the same integral number N of storage devices, each storage device having a storage capacity for exactly one time element of the respective input signal to the coder concerned, the encoder and decoder each further comprising a selector switch arranged to select the storage device in a respective sequence dependent upon the said program, the arrangement being such that as each storage device is selected it stores a time element of the respective input signal while simultaneously transferring any existing time element stored therein to the output of the respective coder concerned.

It can readily be appreciated from the above that, since each storage device transmits its stored time element while storing a new time element, there is no redundancy, and the number of storage elements may therefore be reduced.

Figure 2:
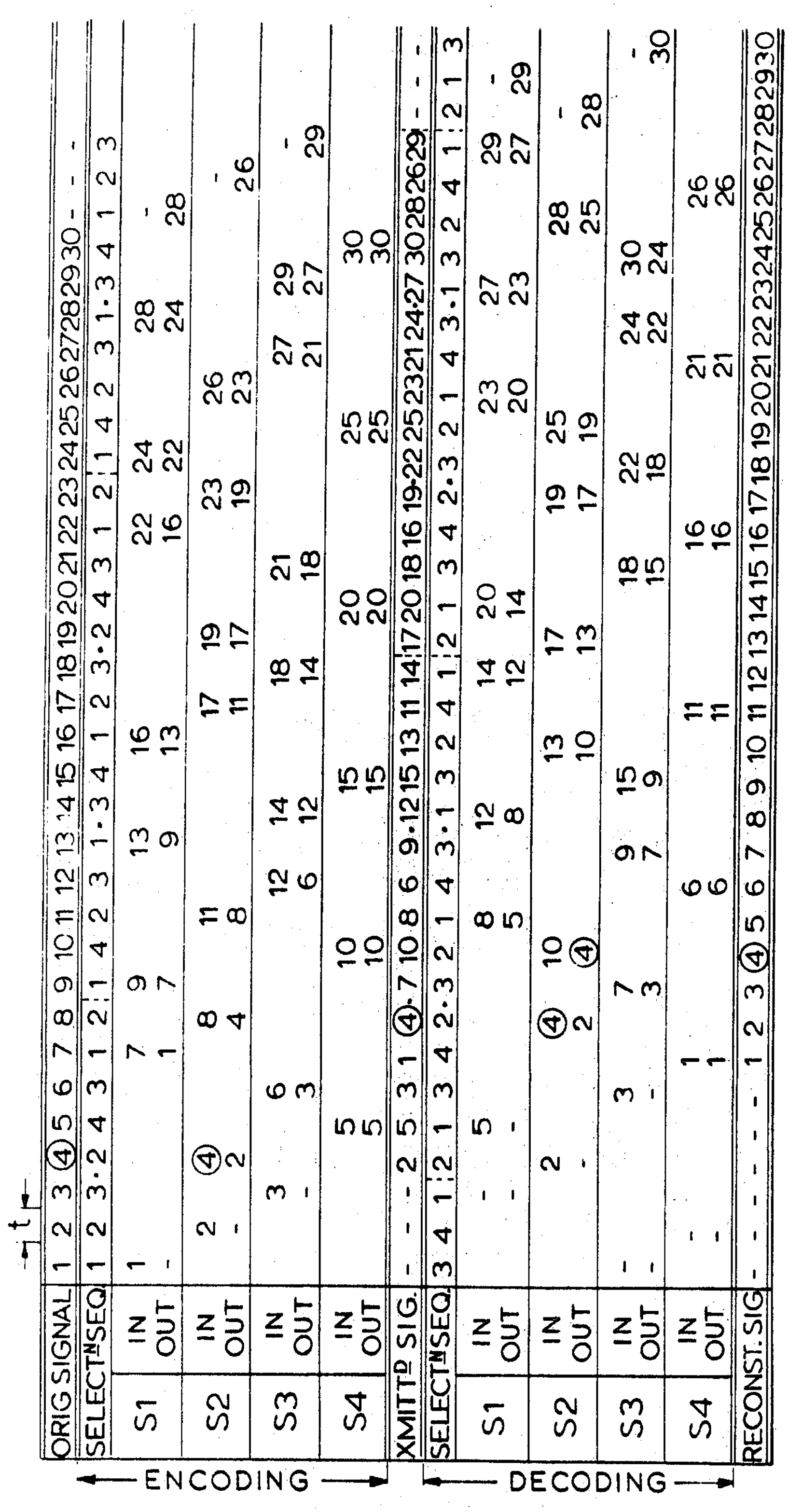
Figure 4:
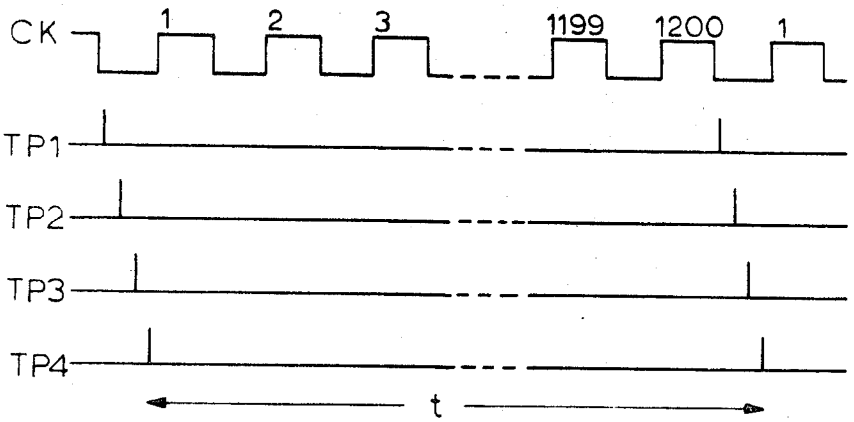
Figure 9:
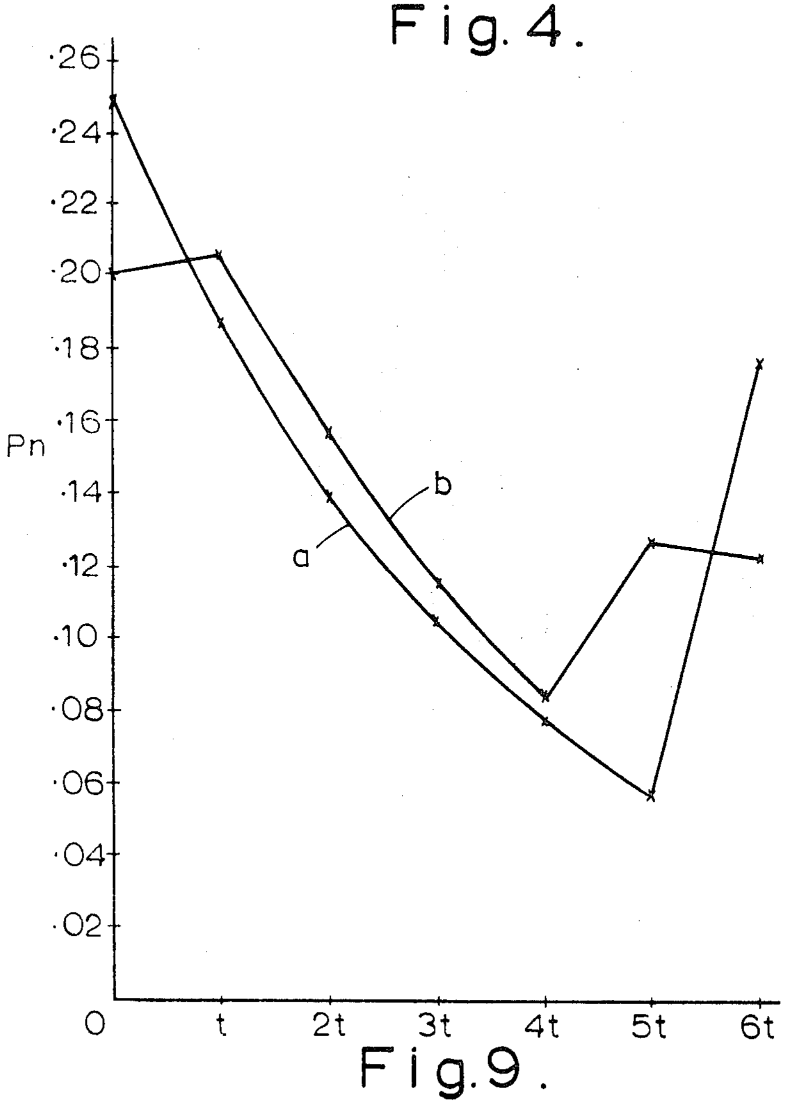
Figure 5:
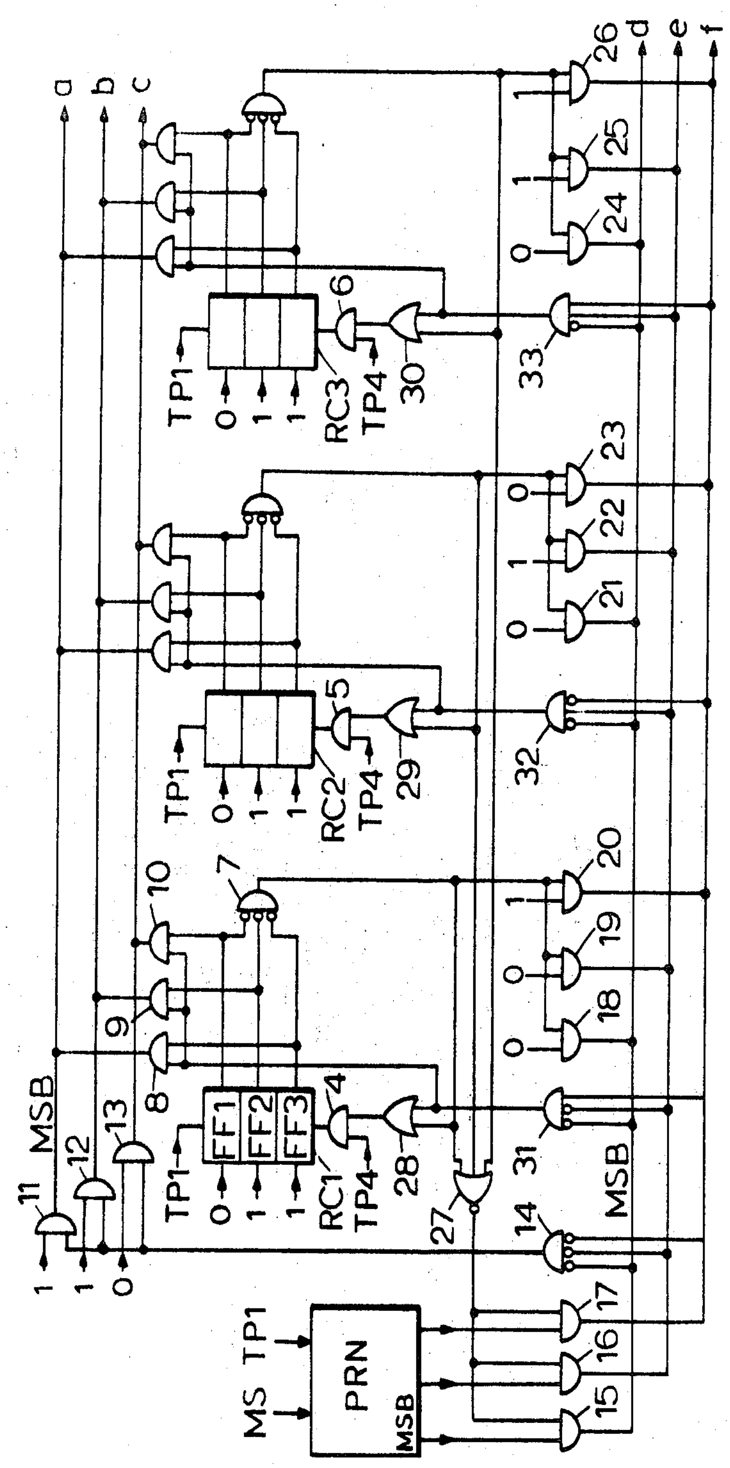
Figure 6:
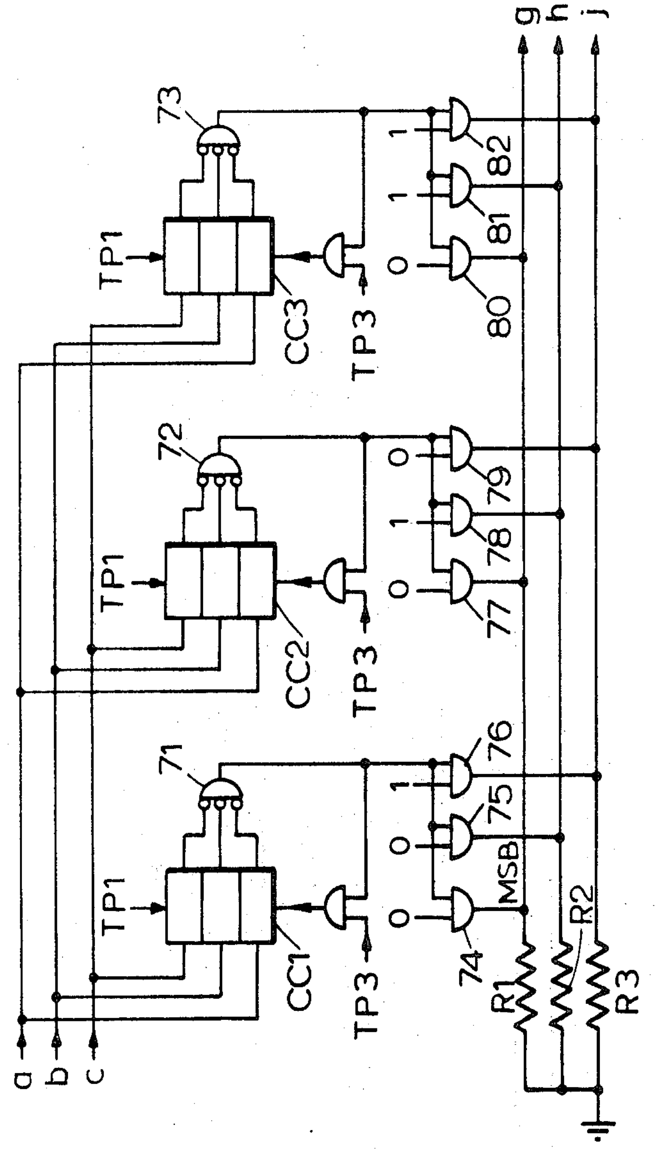
Figure 7:
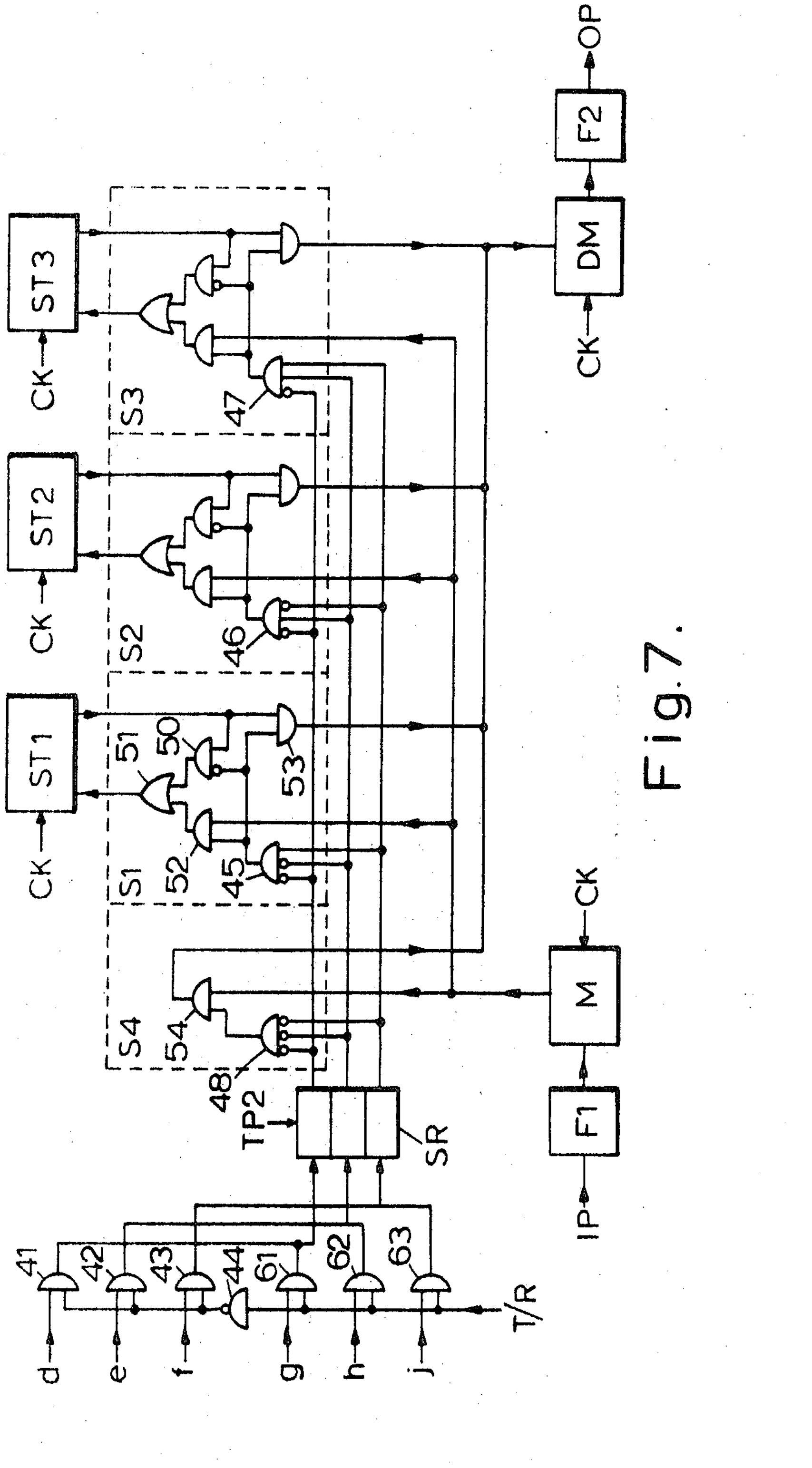

The various features and advantages of the invention will be apparent from the following description of exemplary embodiments thereof, taken in conjunction with the accompanying drawings, of which:

FIG. 1 shows in schematic form a privacy system according to the invention,

FIGS. 2 and 3 show typical encoding-decoding programs, FIG. 4 is a timing pulse sequence diagram, FIGS. 5, 6 and 7 show a practical embodiment of a system according to the invention, FIG. 8 shows the operational sequence of the system show in FIGS. 5, 6 and 7 when performing the encoding-decoding program of FIG. 3, and FIG. 9 is an element delay probability graph.

Referring now to FIG. 1, the coder comprises three storage devices ST1, ST2, ST3 and a selector switch comprising a switching program control unit SPC which controls the operating sequence of four switches S1 and S4 such that only one of the switches is operated at any one time. In the Figure, switch S2 is shown operated, the remaining switches being unoperated.

Each storage device has a capacity to store a single time element, of duration $t$, of the incoming signal. A time control pulse generator TC provides time element control pulses TP to the control unit SPC at intervals $t$ whereby each switch is operated for a duration $t$. It can be seen that, with a switch in the unoperated condition, the output of the associated storage device is connected to its input. Assuming for a moment that each storage element comprises a delay line having a delay equal to $t$, the content of each storage device associated with an unoperated switch recirculates at intervals of $t$, and a time element of the input signal may be retained in the storage device for any multiple of $t$.

It will be obvious to those skilled in the art that the storage devices may take any of several alternative forms. They may comprise, for example, dynamic shift registers — analogue or digital according to requirements — which recirculate their contents, so long as the associated switch S is unoperated, under the control of clock pulses (not shown) derived from the time pulse generator TC. In this event, the control pulses TP are arranged to be coincident with a clock pulse and $t$ is an integral multiple of the clock pulse interval. Alternatively, the storage devices may comprise read/write stores such as a core store array. The essential feature of the stores for the present purpose is that they are capable of reading out their stored information simultaneously with the writing-in of new information.

When any switch S is in the operated condition, the input of its associated storage device ST is connected to the input signal source IP and its output is connected to the common output OP.

It can readily be seen that, by operating the switches S in a predetermined sequence, an input signal at IP is chopped up into time elements which appear at the output OP in rearranged form according to the particular sequence chosen. In the particular embodiment shown, no storage device is associated with switch S4 with the result that a signal appearing at input IP appears at the output OP without any delay being incurred when switch S4 is operated; i.e. the output appears in real time. As will be evident from the practical example which follows, this preferred form of the embodiment provides particular economy in the provision of storage devices in that, for any re-arrangement of elements in groups of X, only $(X-1)$ storage devices are required.

The operation of the system will be apparent from the example of a typical encoding-decoding program shown in FIG. 2. An original intelligence signal is divided into 30 time elements, each of duration $t$, as shown in the top line of the Figure. The second line shows the program sequence in which the switches S are switched. The particular elements fed into the stores and also out of the stores as each is switched are shown in the rows for each of the switches S1 and S4. It should be noted that no store as such is provided for S4 (see FIG. 1); so the elements concerned are, in effect, switched straight in and out as shown.

As each store is selected, the information therein is fed to the output to build up the transmitted signal shown.

At the receiving end, this unintelligible signal is fed into the storage elements according to a selection sequence program which, in the present example, is the reverse of that used for encoding. The progress of each element into and out of the stores is shown in the lower half of the Figure and the reconstituted original signal is shown in the bottom line.

The general sequence for the encoding process is as follows. Element 1 is fed into store 1 by S1 and, as the store is empty, no output is given (indicated by the dash). Similarly element 2 is fed into store 2 and element 3 is fed into store 3. Element 4 is then fed into store ST2. At the same time, already-stored element 2 is transmitted from the store to form the first element of the transmitted signal. Element 5 is then fed straight to the output by S4 and forms the second element of the transmitted signal. Element 6 is then fed into store 3 which simultaneously transmits already-stored element 3 to form the third element of the transmitted signal — and so on.

A similar process is followed for decoding the transmitted signal and the whole process can readily be understood by taking element 4 (shown ringed) of the original signal. Element 4 is switched into store 4 in the fourth time interval $t$ and is switched to form an element of the transmitted signal during the eighth time interval (while element 8 is being switched into the store). At the receiving end of the system, which operates in synchronism with the transmitting end, element 4 is switched by S2 into store ST2. In the 10th time interval, S2 again operates to transfer the stored element 4 to the output signal in the correct position.

In the example, it will be seen that the signal is divided into groups of five elements each and the sequence is repeated every three groups. Thus for a five element group $(X = 5)$ and this particular rearrangement, only three $(X - 2)$ stores are used. If a tapped delay line implemenetation were used for this particular rearrangement then five delay elements would be needed instead of three. This demonstrates that less storage is needed in the system according to the invention than with the tapped delay line implementation.

Obviously, the value of X and also the number of different patterns used for the groups could be larger in practice. In the example shown, of course, there could be 120 (i.e. 5!) different patterns for the groups and, if all of these were used, the cycle would repeat every 600 elements.

The encoding-decoding program example shown in FIG. 2 has been chosen for clarity of explanation. A code which is divided into groups of N is not particularly difficult to break by a third person having a suitable analyzing equipment. The coding example given in FIG. 3 shows that it is not necessary to divided the intelligence signal into groups. The only difference between this Figure and FIG. 2 is that a different encoding-decoding sequence has been adopted and it will be seen from the transmitted signal that the sequence cannot be divided into any repeating groups. This will be readily apparent by taking groups of, say, five elements of the original signal and observing their spread in the transmitted signal. Thus elements 1–5, 6–10, 11–15, 16–20, 21–25, and 26–30 are respectively spread over 7, 8, 10, 9, 10, and 7 elements in the trasnmitted signal. This shows the system to be very versatile regarding coding sequences. It will also be seen from this example that it is not necessary for decoding sequence to be the reverse of the encoding sequence.

There is an obvious constraint on the encoding-decoding switching sequences used in that no store must be allowed to store an element for longer than the overall transmission delay 2N$t$. In the case of the system of FIG. 1, where $2N = 6$, if any store has not been switched for six element times since it last stored an element, then it must be switched in the seventh element time to discharge the stored element and avoid a delay or greater than $6t$.

In a preferred embodiment of the invention the delay imparted to each element in the encoding process is detected at the decoder, whereupon each element is further delayed by an amount such that its total delay is made up to $2Nt$. It is to be understood in this context that the term "delay" is intended to include the zero delay imparted to an element when direct switching by switch S4 (FIG. 1) is used.

Thus an element delayed in the encoder by $n$ time intervals, where $0 \leq n \leq 2N$, will appear in its correct sequence after decoding if it is delayed in the decoder by $(2N-n)$ time intervals. Taking the sequence shown in FIG. 2, for example, where $2N=6$, the ringed element 4 is delayed by $n=4$ intervals in the encoder and is further delayed by $(2N-n)=2$ intervals in the decoder to make its overall delay up to $2N=6$ intervals.

The method of operating a system according to the preferred embodiment is based on the recognition of the fact that the delay imparted to an element in the encoder may be determined by examining the intervals between successive operations of the switches. Thus taking the successive operations of switch S1 of FIG. 2 as an example, it is operated during time element 1 and next operates during time element 7, i.e. a delay of six time intervals $t$. Element 1 stored in store ST1 is thus delayed by $6t$. Element 7 is then stored until the next subsequent operation of switch S1, i.e. for $2t$.

In a practical emebodiment of the invention, a pseudo-random number generator which generates a sequence of numbers each lying between O and N is used in the encoder to generate the switching sequence for switches S. In the decoder, a further pseudo-random number generator is maintained in synchronism in known manner with that in the encoder such that the same sequence is simultaneously available at both the encoder and the decoder. In the decoder, the delay imparted to each element in the encoding process is determined by detecting the interval sequences for each switch and this delay is then made up to $2Nt$ for each element concerned.

Since the overall encoding-decoding delay imparted to each element is $2Nt$, i.e. $6t$, then the 6 complement of the encoder delay for each element must be given to that element in the decoder. Thus, for the decoding of the example given in FIG. 3, element 1 must be switched into a store and delayed by $2t$ since it is already delayed by $4t$. Element 2 must be switched directly by S4 since it has already been delayed by $6t$ in the encoder, and so on.

Thus, by this means at the decoder, all the elements are rearranged in their correct order, simply by determining from the locally-generated sequence the delay imparted to each element by the encoder, and arranging that this delay is built up to $2Nt$ in the decoder by appropriate store switching.

It will be apparent that, by this means, once the first three stores have been selected for the first three elements of the received signals, the remainder of the operation can be made entirely automatic if each of the stores is arranged to discharge its contents at the appropriate time, since each store stores a new element each time it discharges an existing element.

This can be readily achieved by arranging that as each element is switched into a store the selector switch is programmed to discharge the store (and hence also to store a new element) after the appropriate time. A practical method of achieving this will now be explained in relation to a practical embodiment of the system according to the invention with reference to FIGS. 4 to 7 of the drawings.

FIG. 4 shows the sequence of element timing pulses TP and clock pulses CK generating by the timing control pulse generator TC of FIG. 1. In this particular embodiment, which is arranged for the transmission of speech signals, the storage devices ST (FIGS. 1 and 7) comprise dynamic shift registers each having a storage capacity of 1,200 bits and clocked by pulses CK at 19.2 kHz. Thus the element time $t$ is 62.5 mS(16 elements per second). The beginning of each element is denoted by a sequence of four timing pulses TP1–4.

The switching program control unit SPC of FIG. 1 is shown in detail in FIGS. 5 and 6, and the switches S of FIG. 1 are shown in detail in FIG. 7.

The equipment shown in FIGS. 5 and 7 can be used as a transmitting encoder or as a receiving decoder by connecting a logic 0 or 1, respectively, to the T/R lead in FIG. 7. Thus, the system comprises identical equipment at each end.

Referring now to FIG. 5, a pseudo-random number generator PRN generates a sequence of numbers, each in the range 0 to 3 expressed in binary form, for controlling the store switching selection sequence. The generator is driven by time pulses TP1 so that each three-bit binary number generated has a duration equal to $t$. The pseudo-random sequence is initiated on receipt of a message start pulse simultaneously at the encoder and decoder on lead MS. Means for providing such pulses, and also for maintaining the bit rate in synchronism, at each end of the system are known per se and may, for example, be of the type disclosed in our co-pending British application Pat. No. 30156/70. Thus the numbers being generated at any moment by the encoding and decoding number generators PRN are identical. The binary output is provided in parallel 3-bit form, the most significant bit being shown as MSB wherever applicable.

Three recording counters, RC1, RC2 and RC3 are provided each comprising a count-down counter having three binary stages FF1, FF2 and FF3. Each counter is stepped down one step each time a TP1 pulse is received and are so arranged that, on receipt of an enabling pulse from its respective AND-gate 4,5 or 6, the counter stages are preset in parallel according to the inputs shown to the left of each stage. Each counter is preset to a value 2N which, in the present example is 6 which, in binary form, is 110 as shown in the Figure.

The logic circuitry associated with each of the counters RC is identical and comprises an AND-gate 7 having three inverting inputs connected to the respective outputs of the counter concerned, and three AND-gates 8, 9 and 10 each having an input connected to the respective output of the counter. The outputs of the AND-gates 8, 9 and 10 associated with each counter are connected in parallel to three leads $a$, $b$, and $c$ of a data highway. The outputs of AND-gates 11, 12 and 13 are also connected to leads $a$, $b$, and $c$ respectively such that, on receipt of an enabling (1) signal from AND-gate 14, binary number 110 is passed to the data highway.

Leads $d$, $e$, and $f$ form an encoder store address highway fed by the outputs of 12 AND-gates 15 to 26 arranged in four groups of three such that, if AND-gates 15, 16 and 17 are enabled by a 1 signal output from NOR-gate 27, the output of number generator PRN is passed to the highway; if AND-gates 18, 19, 20 are enabled by a 1 output of AND-gate 7 — i.e. if counter RC1 is giving an 000 output — then 001 is passed to the encoder address highway; if gates 21, 22, 23 are enabled by a 000 output of counter RC2 then 010 is passed to the address highway; and if gates 24, 25 and 26 are enabled by a 000 output of counter RC3 then 011 is passed to the highway. Enabling pulses fed to the latter three groups of AND-gates are also fed to the inputs of NOR-gate 27 and to an input of a respective OR-gate 28, 29, 30.

From the foregoing it can readily be appreciated that, provided none of the recording counters RC has counted down to zero, then the pseudo-random number sequence generated by generator PRN is passed to the encoder address highway but that, if any counter reaches zero, the output of gate 27 goes to 0 which, in turn, inhibits gates 15, 16, 17 to prevent the current generator number from reaching the store address highway. At the same time, the 1 output from gate 7 of the counter concerned enables the associated AND-gates such that a number representative of the counter concerned is passed to the address highway. It will be shown, with reference to FIG. 7, that the 3-bit numbers appearing on the encoder address highway are used to address the three stores ST1, ST2, ST3 via switches S1, S2, S3 and the direct input-to-output connection via switch S4. Thus the stores and the direct connection are selected in a sequence dictated by the random number generator PRN but if a store has not been selected in 2N intervals since its last selection, then the number generator output is suppressed for the $(2N+1)$th interval and the store concerned is automatically selected for this interval. In this way the previously-mentioned condition that no store must be left unselected for more than 2N intervals is satisfied.

The addresses passed to the encoder address highway leads are detected by gates 14, 31, 32 and 33 and these gates respond to the respective codes generated by the number generator PRN. Thus if code 001 is generated, gate 31 is enabled and this passes an enabling signal to gates 8, 9 and 10 associated with counter RC1. The contents of counter 1 are then passed to the data highway. Each time a counter is selected, it is preset to 2N and then counts down one step for each time interval. Thus counter RC1 records the 2N-complement for each time interval, ie. the number of time intervals the last stored content of store ST1 must be further delayed by the decoder to bring the total delay up to 2Nt. If the address 000 (ie. a direct connection by switch ST4) is generated, gate 14 is enabled and this causes 110 (i.e. $2N=6$ in the present case) to be passed by gates 11, 12, 13 to the data highway. The information on the data highway is only used when the equipment is used as a decoder. The operation in the decode mode will be subsequently described with reference to FIG. 6.

Referring now to FIG. 7, input address code pulses appearing on encoder address highway leads *d, e, f* are passed to a store address register SR via AND-gates 41, 42, 43, these gates being enabled in the encoder mode by a 0 on the transmit-receive lead T/R being changed to a 1 by inverter 44. The address code pulses are clocked into register SR by a TP2 pulse and are then stored for the remainder of the element time — i.e. until the next TP2 pulse arrives to cause the next subsequent address to be stored. The stored codes are detected by detector gates 45 to 48 which act as input control gates for switches S1 to S4 respectively.

Stores ST, ST2, and ST3 are associated with switches S1, S2, S3 as for FIG. 1. When a switch, for example S1 is unoperated, gate 45 has a 0 output with the result that AND-gate 50 is enabled. The stored contents of shift register ST1 are thus able to recirculate, under the control of the 19.2 kHz pulses CK, via gate 50 and OR-gate 51. If the number stored in the address register SR is 001, gate 45 is enabled and this opens AND-gates 52 and 53, and inhibits gate 50. The recirculating path for the shift register is now inoperative and the input to the shift register is connected to the output of an analogue-to-digital converter M via gates 51 and 52. The output of the shift register is connected via gate 53 to a digital-to-analogue converter DM. Thus, for the period that address-sensing gate 45 is enabled, the existing contents of shift register ST1 are passed to the output and a fresh element from converter M is stored. The operation of switches S2 and S3 is exactly the same as for S1.

If code 000 is stored in the address register SR, AND-gate 48 is enabled which, in turn, enables AND-gate 54. In this case, a direct connection is therefore established between the output of converter M and the input of converter DM via gate 54.

The various gates, switches, and stores operated by the codes generated by generator PRN are:

| Code | Gate | Recording Counter | Switch | Store |
|---|---|---|---|---|
| 001 | 31 | RC1 | S1 | ST1 |
| 010 | 32 | RC2 | S2 | ST2 |
| 011 | 33 | RC3 | S3 | ST3 |
| 000 | 14 | — | S4 | — |

Speech signals appearing at the input IP are filtered by a low pass filter F1 and converted to binary coded signals by analogue-to-digital converter M driven at 19.2 kHz by clock pulses CK. The converter may have the well-known form of a pulse code modulator. The binary coded signals are fed in parallel to gates 45 to 48 of switches S1 to S4 respectively. As the switches are operated in sequence, so the binary signals are fed into respective stores (switches S1 to S3) or are connected directly to demodulator DM (switch S4). Demodulator DM receives the store output signals or the direct signals and reconverts them to analogue signals in the form of time-element-transposed speech signals. Switching and other spurious signals are removed by a second low pass filter F2 and the scrambled speech signals appear at output OP for transmission by conventional means such as by radio or transmission line.

For decoding an encoded signal, a 1 is put on the T/R lead (FIG. 7) which inhibits gates 41, 42, 43 and enables gates 61, 62, 63 so that codes appearing on leads *g, h, j* are now clocked into the address register SR. Due to these leads being connected to earth via resistors R1, R2, R3 (FIG. 6) each has a 0 in the normal state.

The decoding control equipment shown in FIG. 6 comprises there identical controlling counters CC1, CC2, CC3 and associated circuitry very similar in nature to the recording counters shown in FIG. 5. Each counter, upon reaching zero count, operates an associated AND-gate 71, 72 or 73 which causes the address of the counter concerned to be transferred to a decoding store address highway comprising the leads *g, h* and *j* via one of the groups of AND-gates 74–76, 77–79, 80–82.

It will be recalled that, as each recording counter RC was selected by an address code, it transferred its count state to data highway leads *a, b* and *c;* this count state representing the number of time intervals the stored data must be further delayed in the decoder to make up an overall delay of 2Nt for every element. These count states are taken over by the controlling counters CC1–3 which counters are decremented by one step, under control of pulses TP1, for each time element. Thus if an element is delayed in the encoding process by, say, three time intervals, the recording counter RC concerned will have a count state 011 when the element concerned is transmitted. This count state is passed over the data highway leads *a*, *b*, *c* to one of the controlling counters CC in both the transmitting and receiving devices (since they are operating in precise synchronism) and the counter concerned will reach zero count after a further three time intervals whereupon it transfers its address to the decoder store address highway and this address is stored in the address store register SR (FIG. 7) of the receiving equipment. This stored address causes a particular one of the switches S to operate and it can readily be appreciated that the stores ST or the direct connection will be selected by switches S1 to S4 automatically such that every element is delayed in the decoder by the 2N-complement of the delay imported to it in the encoder, provided that the recording and controlling counters are suitably preset at each end of the system at the commencement of the transmission — ie. by the message start pulse appearing on lead MS.

The truth of this can be seen from the following example, where it is assumed that recording counters RC1, RC2, RC3 are preset to 001, 010 and 011 respectively and controlling counters CC1, CC2, CC3 are preset to 100, 101 and 110 respectively. The operational sequence will be taken in relation to the encoding-decoding sequence example given in FIG. 3. FIG. 8 illustrates how the contents of each of the counters controls the sequence of the encoder and the decoder. Each successive line of the Table given in FIG. 8 represents the start of a new element, when a new pseudo-random number is available and all counters are decremented by one step. When any counter reaches the zero count state, it is almost immediately loaded with a new number and this is represented in the Table by the entry, for example of 60 meaning that the counter reaches 0 for a moment and is then loaded with 6 (decimal digits being used here purely for convenience and ease of appreciation of the sequence). The first line shows the preset state of the counters. The second line shows the state when the counters are decremented by 1, the first element is stored, and the pseudo-random number generated is 3. Counter RC1 is decremented to 0 and therefore gives an encoding store address 1 (i.e. ST1) and overrides the pseudo-random number 3. The first element is therefore stored in store ST1 in the encoder.

During the second time interval, counter RC2 reaches zero and is reset to 6. The second element is therefore stored in store ST2. In the third time interval, counter RC3 reaches zero and the third element is stored in store ST3. During the fourth time interval, no counter RC reaches zero so pseudo-random number 3 selects store 3, which therefore stores element 4 and transmits the already-stored element 3. Counter RC3 is selected and is therefore reset to 6. In the decoder, controlling counter CC1 reaches zero and is reset to the code appearing on the data highway, i.e. 5. Counter CC1 resetting causes decoder store ST1 to be selected which store consequently stores element 3 transmitted by the encoder.

During the fifth time interval, counter RC1 is selected which therefore resets to 6 and selects encoder store ST1 which transmits the already-stored element 1 and stores element 5. The 2 in counter RC1 prior to reset is passed to the data highway and loaded into counter CC2 which has reached the zero count state. Decoder store ST2 therefore stores the received element 1.

During the sixth time interval, the pseudo-random number is 0. This is detected by gate 14 (FIG. 5) which causes 6 to be transferred to the data highway. The 0 on the store address highway causes S4 to be operated and, hence, the direct transmission of element 6. At the encoder, counter CC3 reaches zero and so element 6 is stored in store ST3.

During the seventh time interval, the pseudo-random number is 0 and therefore element 7 is transmitted directly. At the decoder, controlling counter 2 is selected since it reaches zero and element 7 is therefore stored in store ST2 which, therefore, outputs already-stored element 2. The process then continues for the remainder of the elements concerned.

The initial preset condition of the counters may be achieved in a similar manner to that shown for resetting each counter to 6 when it reaches zero state, the preset condition being triggered by the message start pulse. The means for achieving this is not shown in the Figures but will be obvious to those skilled in the art.

All the components used in the embodiment are well known per se and most are available commercially in integrated circuit form. Since the system uses digital logic almost entirely, it is particularly suitable for implementation in integrated circuit form with the result that the equipment is compact, relatively cheap, and uses only small power. This makes it ideal for use in conjunction with mobile radio transmitters.

The probability of delaying an element in the encoder by zero, i.e. a direct input-output connection, is, in the present embodiment 0.25 since there is a 1 in 4 chance of selecting the direct connection. Thereafter, the general probability Pn of delaying a time element by *nt* is:

$$Pn = ps(1 - ps)^n$$

where *n* is a positive integer and *ps* is the probability of choosing a particular store or direct connection.

In the present example, where the number of stores is 3 and there is one direct connection, $ps = 0.25$ and $Pn = 0.25\ (0.75)^n$. This curve is followed between the values of 1 and 5 for n. The maximum delay that can be given to any element, however, is $nt = 6t$. Therefore the probability curve at point $n = 6$ shows a sharp increase since it represents the sum of all the probabilities for $n \geqslant 6$. The total probability distribution curve is shown as curve *a* in FIG. 9. From this it will be seen that delays of zero and $6t$ predominate in the distribution of delays; there being four times the probability that the direct connection will be chosen instead of a $5t$ delay, for example. This may be of assistance in breaking the code and it is obviously preferable to lessen these predominances. A method of achieving this will now be explained.

If, for example, number generator PRN is made to generate a sequence of 15 numbers, three of which cause the direct connection to be chosen, and four of which are used for addressing each of the three stores, then the probability of selecting the direct connection becomes 3/15, or 0.2. This removes the predominance of zero delay selection. The formula for Pn now becomes $$Pn = (1 - po)\, ps\, (1 - ps)^{n-1}$$

where *po* is the probability of choosing the direct connection.

In the present example, $po = 3/15 = 0.20$ and *ps*, the chance of choosing any store, $= 4/15 = 0.266$. This gives a new probability distribution curve *b* in FIG. 9, from which it can be seen that the probability of a direct connection approximately equals the probability for $n = 1$.

The other end of the curve is affected by changing the preset value for one or more of the recording counters RC (FIG. 5). If one counter is preset to 5, then the associated store has a maximum storage delay of 5t with the result that the probability for $n = 5$ is increased and the probability for $n = 6$ is decreased, as can be seen from curve *b*. Thus the major predominances at both ends of the original curve *a*have been removed and the distribution of delays is spread more evenly.

This process may obviously be developed further, if required, though it is doubtful if this would be merited in practice with the particular embodiment shown. Thus, for example, one of the remaining recording counters, having a maximum delay of 6t, could have its delay reduced to 4t by resetting it to 100 instead of 110. This would, of course, increase the probability for $n = 4$ and reduce the probabilities for $n = 5$ and $n = 6$. This would, in fact, apply too much correction for $n = 4$ but, since each stoarage device now has a different maximum storage time imposed on it by its recording counter, the probability of selecting any store or the direct connection may be adjusted by varying the number of addresses from the number generator allocated to it. This selection principle has increasing utility as the number of stores used increases.

The number generator PRN may have alternative forms than a pseudo-random number generator. Thus, for example, it may comprise a large store containing previously-recorded numbers from which the numbers are read out at intervals *t*. This would enable the coding sequence to be changed at will be merely changing the store for another having a different sequence of numbers. The security of the system may therefore be increased by having sets of identical number-generating stores at the transmitting and receiving ends and periodically removing the existing stores and plugging in a different one. Conveniently, the stores comprise plug-in integrated circuit blocks.

Although the invention has been described with reference to an exemplary embodiment using dynamic shift registers, it is not, of course, limited to the use of such registers. It will be obvious to those skilled in the art that other forms of storage devices could equally well be used. Conventional delay lines may be used, employing either digital or analogue techniques. Static stores such as core stores may alternatively be used, in which case there is no need for a recirculatory path. The essential requirements of any storage device which may be used are that it can store exactly one element of the signal and that a new element can be written in simultaneously with the reading out of an already-stored element.

What I claim is:

1. A privacy transmission system for the transmission of intelligence in which signals derived from the intelligence are divided into consecutive time elements each of duration *t* and the sequence if the elements is disarranged in accordance with a predetermined program in an encoder to form an unintelligible sequence for transmission and in which after reception the elements of the unintelligible sequence are rearranged in their original sequence in a decoder, wherein the encoder and decoder each comprise the same integral number N of storage devices, the storage devices in each coder being arranged in parallel between the signal input and output of the coder, each storage device having a storage capacity for exactly one time element of the respective input signal to the coder concerned, the encoder and decoder each further comprising a selector switch arranged to select the storage devices in a respective sequence dependent upon the said program, the arrangement being such that as each storage device is selected it immediately and directly stores a time element of the respective input signal and simultaneously transfers any existing time element stored therein directly to the output of the respective coder concerned.

2. a system according to claim 1 wherein each selector switch is further arranged to be able to select a direct connection between the signal input and the signal output of the coder concerned in defendence upon the program, whereby a time element may be switched directly from the input to the output of the coder concerned.

3. A system according to claim 1, wherein each time element is delayed in the encoding - decoding process by a total time equal to 2 *Nt*.

4. A system according to claim 3 wherein each element is delayed by a time equal to *nt* in the encoder and by a time equal to $(2N - n)t$ in the decoder, where $1 \leq n \leq 2N$ and *n* is variable according to the program.

5. A system according to claim 3 further comprising means for selecting a direct connection between the signal input and the signal output in response to said program, wherein each element is delayed by a time equal to nt in the encoder and by a time equal to $(2N - n)t$ in the decoder, where $0 \leq n \leq 2N$ and *n* is variable according to the program.

6. A system according to claim 4 including delay determining means in the decoder for determining from the said program the delay *nt* imparted to each element in the encoder.

7. A system according to claim 6 wherein the decoder further includes control means operative in dependence upon the delay-determining means to cause each element to be delayed by $(2N - n)\,t$.

8. A system according claim 1 including synchronized program generators in the encoder and decoder arranged to generate the same program of varying values for *n* simultaneously in each coder.

9. A system according to claim 7 wherein each program generator comprises a number sequence generator which generates a sequence of numbers each up to and including N in a sequence constituting the said program and wherein the encoder selector switch is operated in dependence upon the said sequence.

10. A system according to claim 9 in which each generated number in the sequence causes the selector switches to select a particular switching position and, hence, to select either a particular storage device or the said direct connection as the case may be.

11. A system according to claim 10 in which each switching position is selectable by any one of a plurality of different generated numbers in the sequence.

12. A system according to claim 1 in which each storage device is provided with an associated recording counter for counting the number of intervals of duration $t$ that have lapsed since the last time the storage device was selected.

13. A system according to claim 12 in which in the encoder each recording counter causes its associated storage device to be selected by the selector switch when a given number of intervals is recorded by the counter, this selection being made irrespectively of the number currently generated by the number generator.

14. A system according to claim 13 in which the given number of intervals is equal to or less than 2N.

15. A system according to claim 14 in which the given number for at least one recording counter is 2N and in which the given number for at least one other recording counter is less than 2N.

16. A system according to claim 12 in which the decoder is provided with a controlling counter asociated with each storage device for controlling the selection of the storage devices, the controlling counters being set in dependence upon the count state of the recording counters so that each time element is delayed in the encoding-decoding process by the same total amount.

17. A system according to claim 16 wherein the total amount is $2Nt$.

18. A system according to claim 12 in which the recording and controlling counters are count-down-to-zero counters which count down one step during each successive interval $t$.

19. A system according to claim 13 in which each time a storage device is selected its associated recording counter is reset to a count value equal to the given number of intervals.

20. A system according to claim 19 in which in the encoder each storage device is caused to be selected when its associated recording counter reaches the zero count state.

21. A system according to claim 20 in which in the decoder each time a recording counter is reset to the given count number due to its associated storage device being selected by a generated number, the count value recorded immediately prior to the resetting is transferred to a controlling counter.

22. A system according to claim 21 in which as each controlling counter reaches the zero count value it causes its associated storage device to be selected.

23. A system according to claim 9 in which the number sequence generators generate a pseudo-random sequence of numbers.

24. A system according to claim 9 wherein the number sequence generator each comprise a store containing a sequence of previously-recorded numbers from which the numbers are read sequentially at intervals $t$.

25. A system according to claim 1 in which the storage devices comprise dynamic digital shift registers.

26. A system according to claim 20 including an analogue-to-digital encoder.

* * * * *

PO-1050
(5/69)

UNITED STATES PATENT OFFICE
CERTIFICATE OF CORRECTION

Patent No. 3,824,467 Dated July 16, 1974

Inventor(s) RICHARD CHARLES FRENCH

It is certified that error appears in the above-identified patent and that said Letters Patent are hereby corrected as shown below:

Col. 4, line 46, "trasnmitted" should be --transmitted --;

line 49, before "decoding" insert --the--;

Col. 5, line 21, "emebodiment" should be --embodiment--;

Col. 6, line 27, cancel "Pat.";

Col. 8, line 55, "there" should be --three--;

Col. 9, line 44, "60" should be --$\overset{0}{6}$--;

Col. 11, line 23, "ahave" should be --a have--;

IN THE CLAIMS

Claim 1, line 4, "if" should be --of--;

Claim 2, line 1, "a" should be --A--;

line 4, "defendence" should be --dependence--;

Claim 16, line 2, "asociated" should be --associated--;

Claim 24, line 2, "generator" should be --generators--;

Signed and sealed this 17th day of December 1974.

(SEAL)
Attest:

McCOY M. GIBSON JR.
Attesting Officer

C. MARSHALL DANN
Commissioner of Patents